United States Patent
Kawazoe et al.

(10) Patent No.: US 7,400,235 B2
(45) Date of Patent: Jul. 15, 2008

(54) LANE DEPARTURE WARNING MIRROR

(75) Inventors: Hiroshi Kawazoe, Falls Church, VA (US); Hiroshi Tsuda, McLean, VA (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 158 days.

(21) Appl. No.: 11/364,400

(22) Filed: Feb. 28, 2006

(65) Prior Publication Data
US 2007/0200689 A1    Aug. 30, 2007

(51) Int. Cl.
*B60Q 1/00* (2006.01)
(52) U.S. Cl. .................. 340/438; 340/435; 340/903; 296/1.11
(58) Field of Classification Search ........... 340/438, 340/435, 903; 296/1.11
See application file for complete search history.

(56) References Cited

U.S. PATENT DOCUMENTS

| | | | | |
|---|---|---|---|---|
| 4,770,522 A * | 9/1988 | Alten | ............... | 359/873 |
| 4,863,254 A * | 9/1989 | Dyer | ............... | 359/850 |
| 4,907,871 A * | 3/1990 | Hou | ............... | 359/841 |
| 4,927,255 A * | 5/1990 | Martinez | ............... | 359/855 |
| D329,415 S * | 9/1992 | Rhoo | ............... | D12/187 |
| 5,573,006 A * | 11/1996 | Shimotani et al. | ............... | 600/558 |
| 5,644,443 A * | 7/1997 | Hung | ............... | 359/856 |
| 5,737,136 A * | 4/1998 | Boggiatto | ............... | 359/843 |
| 6,588,911 B1 * | 7/2003 | Martinez | ............... | 359/854 |
| 6,657,581 B1 * | 12/2003 | Lippert et al. | ............... | 342/70 |
| 6,758,510 B1 * | 7/2004 | Starling | ............... | 296/39.1 |
| 7,125,130 B2 * | 10/2006 | Xiao | ............... | 359/872 |
| 7,199,767 B2 * | 4/2007 | Spero | ............... | 345/7 |
| 7,202,792 B2 * | 4/2007 | Zhang et al. | ............... | 340/575 |
| 2002/0041498 A1 * | 4/2002 | Furst et al. | ............... | 362/494 |
| 2002/0175813 A1 * | 11/2002 | Ross | ............... | 340/555 |
| 2003/0107826 A1 * | 6/2003 | Shafrir et al. | ............... | 359/841 |
| 2003/0128106 A1 * | 7/2003 | Ross | ............... | 340/435 |
| 2004/0165291 A1 * | 8/2004 | Platzer, Jr. | ............... | 359/868 |
| 2004/0169942 A1 * | 9/2004 | Smith | ............... | 359/871 |
| 2004/0174255 A1 * | 9/2004 | Banco | ............... | 340/468 |
| 2005/0195507 A1 * | 9/2005 | Gonzalvo | ............... | 359/862 |
| 2005/0286148 A1 * | 12/2005 | Lee et al. | ............... | 359/879 |
| 2006/0043751 A1 * | 3/2006 | Mellon | ............... | 296/1.11 |
| 2006/0056086 A1 * | 3/2006 | Hannah | ............... | 359/843 |
| 2006/0098310 A1 * | 5/2006 | Nickence et al. | ............... | 359/843 |
| 2006/0132943 A1 * | 6/2006 | Suzuki et al. | ............... | 359/879 |
| 2006/0220904 A1 * | 10/2006 | Jarlengrip | ............... | 340/901 |

* cited by examiner

*Primary Examiner*—Jeff Hofsass
*Assistant Examiner*—Kerri L McNally
(74) *Attorney, Agent, or Firm*—Young Basile (57) ABSTRACT

A lane departure warning mirror for a vehicle is disclosed that includes a reflecting member and a supporting member that supports the reflecting member on an area of a vehicle within a driver peripheral vision area, wherein the reflecting member is disposed so that an edge mark in a detection area is mirrored to the driver's peripheral vision area.

20 Claims, 6 Drawing Sheets

LANE DEPARTURE WARNING MIRROR

FIELD

Described herein is a lane departure warning mirror for warning a driver about a potential departure of a vehicle from a lane or road of travel.

BACKGROUND

More than half of vehicle accidents are caused when a vehicle departs from a lane of travel due to, for example, driver distraction during driving, even in the case where the driver looks ahead.

To prevent an unintentional lane departure, a lane departure warning system has been proposed. Such a departure warning system detects departure of the vehicle from the lane of travel by using a camera installed in the vehicle, and alerts the driver about the departure by a warning means, such as a flashing lamp and/or an audio device. However, such a system can be expensive.

A lane departure warning mirror for a vehicle is proposed herein. In one embodiment, the lane departure warning mirror includes a reflecting member and a supporting member that supports the reflecting member on an area of a vehicle within a driver peripheral vision area. The reflecting member is disposed so that an edge mark, such as a center line marker, a road side mark, road side guard rail, edge or curb stone, or any other mark representing an edge of a lane or road, in a detection area is mirrored.

Accordingly, the lane departure warning mirror disclosed herein is capable of warning a driver about an imminent lane departure at minimal cost so that the driver may take an appropriate action.

BRIEF DESCRIPTION OF THE DRAWINGS

For a more complete understanding of the representative embodiments of the lane departure warning mirror, and the advantages thereof, reference is now made to the following description taken in conjunction with the accompanying drawings, in which.

DETAILED DESCRIPTION OF THE ILLUSTRATED EMBODIMENTS

While the appended claims are not limited to the illustrated embodiments, an appreciation of various aspects of the lane departure warning mirror is best gained through a discussion of various examples thereof.

Figure 1:
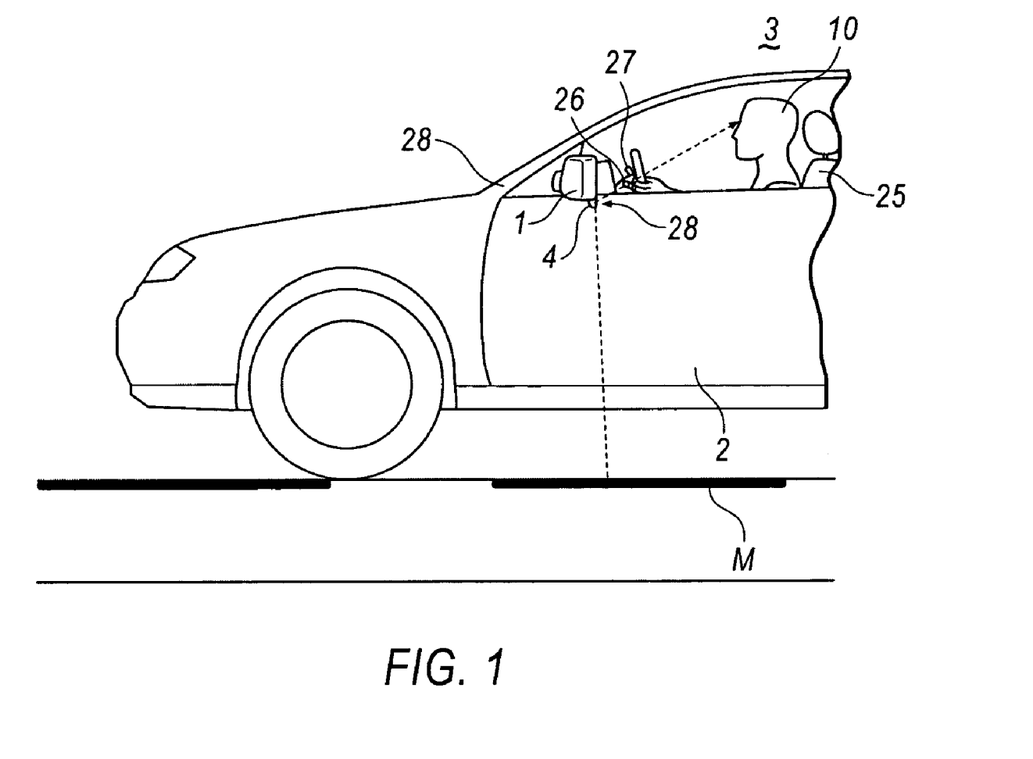
FIG. 1 is a right side elevational view of a vehicle that includes an embodiment of a lane departure warning mirror.

Referring to FIG. 1, an embodiment of a driver side door mirror 1 is provided on a driver side door 2 of a vehicle 3. An embodiment of a lane departure warning mirror 4 is disposed on a lower portion of the driver side door mirror 1.

Figure 2A:
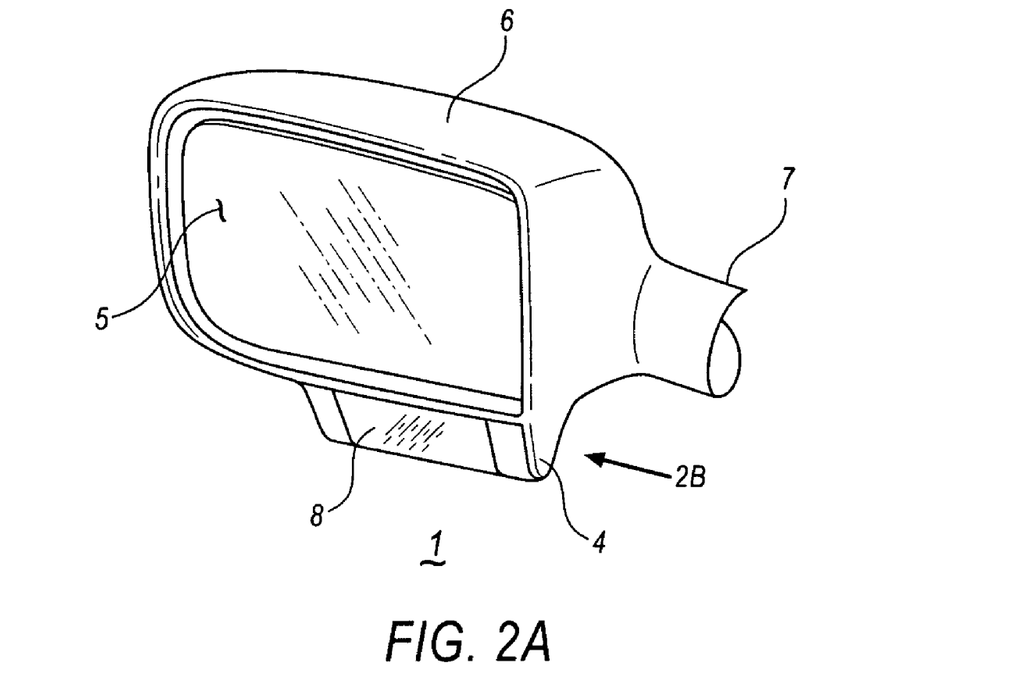
FIG. 2A is a perspective view of a driver side view door mirror and the lane departure warning mirror of FIG. 1.
Figure 2B:
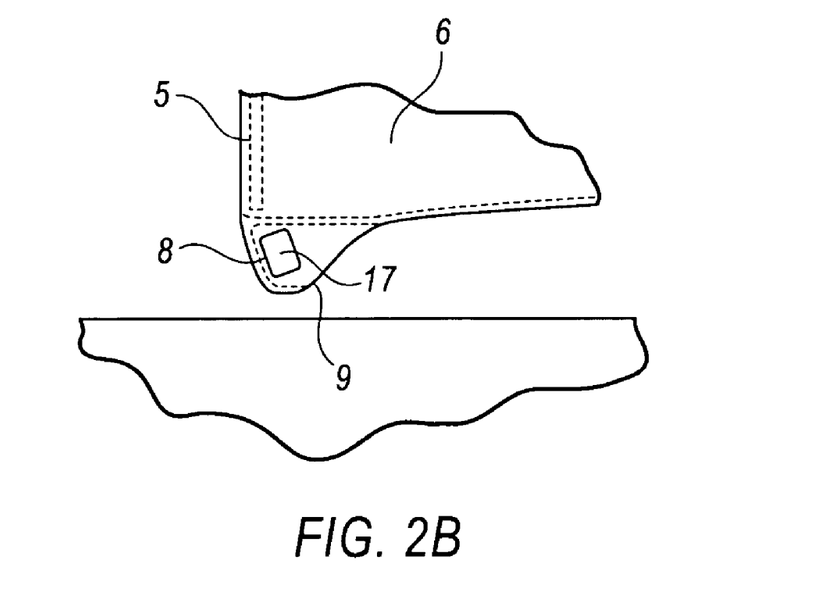
FIG. 2B is a partial cross sectional view of the lane departure warning mirror of FIG. 2A.

FIG. 2A is a perspective view of a driver side door mirror 1 and the lane departure warning mirror 4. The driver side door mirror 1 includes a mirror portion 5, a housing 6, and an arm portion 7. The arm portion 7 attaches to the driver side door 2 with a bracket or other suitable mechanism (not shown). The lane departure warning mirror 4 includes a reflective surface 8 and a projected portion 9. Referring to FIG. 2B, a lane departure warning mirror angle changing unit 17 (to be described in greater detail below may also be provided.

The reflective surface 8 is arranged so as to mirror an edge mark M that may be positioned on a road, for example. The projected portion 9 is formed on a lower portion of the driver side door mirror 1, and the reflective surface 8 is disposed on the projected portion 9. The driver side door mirror 1 and the projected portion 9 may be integrally formed or they may be formed as separate parts so that a driver 10 may attach a separate lane departure warning mirror 4 to the driver side door mirror 1 with adhesive, screws etc. Since the shape of the driver side door mirror 1 may vary across different vehicle manufactures, the projected portion 9 may not be necessary as long as the driver 10 can see the reflection of the edge mark M from the driver seat. Further, the projected portion 9 may be replaced with any suitable mechanism for supporting the reflective surface 8.

The reflective surface 8 may be a glass mirror insert, polished metal insert, reflective film with adhesive such as sticker, or coating formed by, for example, electro-plating on the projected portion 9. The reflective surface 8 may be any shape such as a rectangular, triangle, circle, diamond shape and the like. In addition, the reflective surface 8 can be concave or convex mirror.

Thus, the lane departure warning mirror 4 may have any size, shape or form as long as the reflective surface 8 is disposed in such a manner so that the driver 10 can see a reflection of an edge mark M through the lane departure warning mirror 4 when the vehicle 3 approaches the edge mark M. The larger the edge mark M mirrored on the reflective surface 8 of the lane departure warning mirror 4, the more likely it will be that the driver 10 can notice easily that the vehicle 3 is approaching or about to depart from the lane of travel.

Description of operation of the lane departure warning mirror 4 is provided below.

Figure 3:
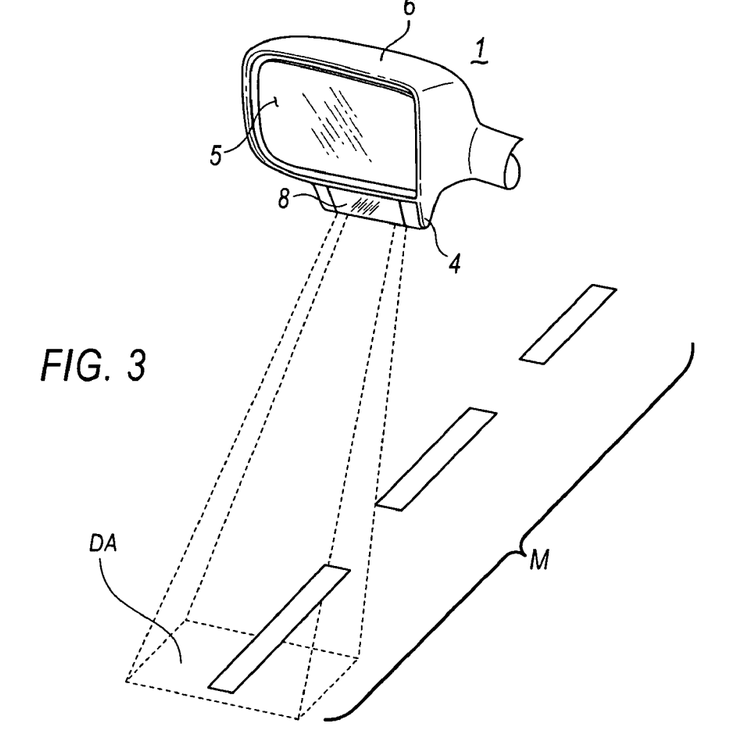
FIG. 3 is a perspective view of the lane departure warning mirror of FIG. 1 in operation.
Figure 4:
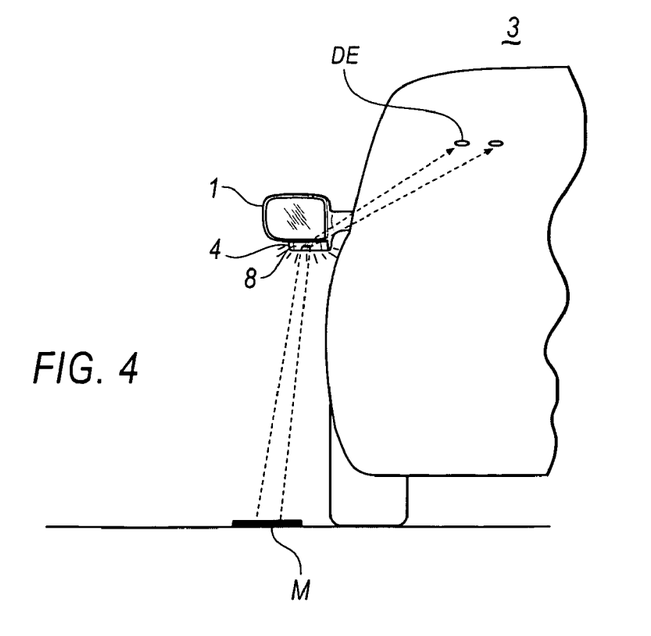
FIG. 4 is a rear side view of the vehicle of FIG. 1.

As shown in FIGS. 3 and 4, when the vehicle 3 approaches the edge mark M, the lane departure warning mirror 4 mirrors a detection area DA such that the edge mark M is visible to the vehicle driver 10 as shown in FIG. 4. The driver 10 would notice the dotted line M mirrored by the lane departure warning mirror 4 even though the driver 10 looks ahead since the lane departure warning mirror 4 is disposed within the peripheral vision area of the driver 10. Thus, the lane departure warning mirror 4 functions as a warning indicator. For example, in the case the edge mark M is a center line such as a white dotted line between two lanes, attention of the driver 10 is effectively drawn since the reflective surface 8 of the lane departure warning mirror 4 reflects the edge mark M as if it is blinking. Thus, the driver 10 will be able to take appropriate action by steering the steering wheel or operating a brake to avoid an undesired lane departure.

By providing the lane departure warning mirror 4, the driver 10 can notice the departure of the vehicle from the lane of travel more easily. Even if the edge mark M is a white or yellow solid line or other edge mark M, the driver 10 would notice change of a mirrored image on the reflective surface 8 since the reflective mirror 8 mirrors the edge mark M as if a warning lamp is lighted.

In one embodiment, the angle of lane departure warning mirror 4 is selectively adjustable so that lane departure warning mirror 4 is within any driver's peripheral vision, thereby enabling any driver 10 to see the predetermined detection area DA when the vehicle is in operation. Indeed, the eye position of the driver 10 may differ based upon a number of factors, including, but not limited to, a seated height of the driver 10, position of seat, etc. For example, the structure of an adjusting mechanism for an adjustable side view vehicle mirror may be adopted so as to make the warning mirror 4 selectively adjustable.

More specifically, in one embodiment, the angle of the lane departure warning mirror 2 can be adjusted in a vertical direction and the vehicle traveling direction so that the driver can see an edge mark M such as a lane marker through the reflective surface 8 of the lane departure warning mirror 4 when the driver 9 is seated in a driver's seat. The angle of the lane departure warning mirror 4 may be manually adjusted by the driver as in adjustment of a rear view mirror.

Figures 5, 6:
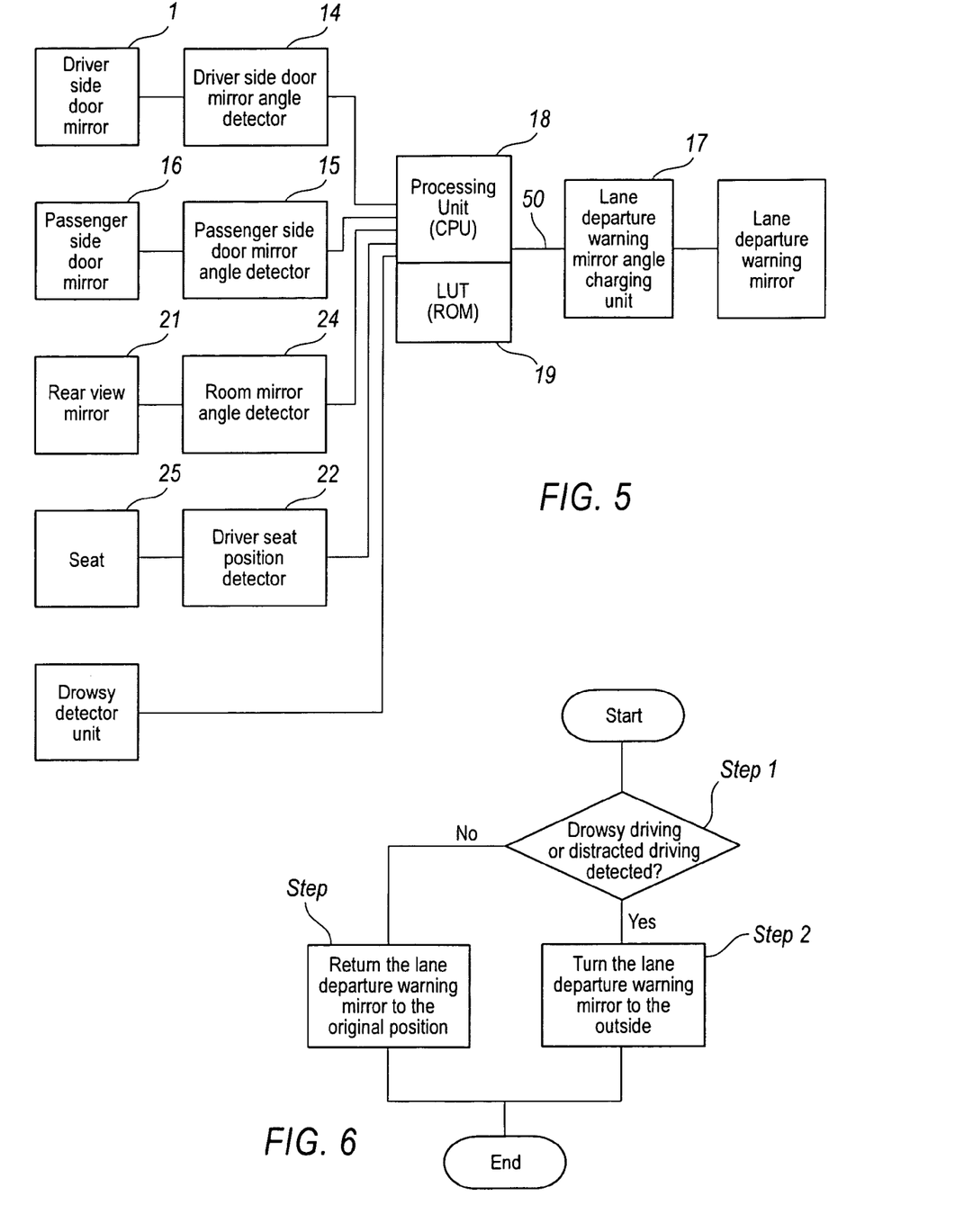
FIG. 5 is a block diagram of a system for adjusting the angle of a lane departure warning mirror.
FIG. 6 is a flowchart illustrating adjustment of the angle of a lane departure warning mirror.

In an alternative embodiment, the angle of the lane departure warning mirror 4 may be automatically adjusted in conjunction with adjustments of side door mirrors and/or a power seat. FIG. 5 shows a block diagram of an embodiment of a mirror angle adjustment system that includes a driver side door mirror angle detector 14 for detecting the angle of a driver side door mirror 1, a passenger side door mirror angle detector 15 for detecting the angle of a passenger side door mirror 16, and a lane departure warning mirror angle changing unit 17, a processing unit 18 (CPU), and a look-up table 19. The driver and passenger side door mirror angle detectors 14 and 15 are connected to the processing unit 18. In the look-up table 19, side door mirror angles are related to those of lane departure warning mirror 4. An output terminal of the processing unit 18 is connected to the lane departure warning mirror angle changing unit 17 for changing the angle of the lane departure warning mirror 4.

To determine the angle of the lane departure warning mirror 4, it is necessary to obtain the relationship between the driver eye position DE and the angle of the lane departure warning mirror 4. The relationship of the angle of the lane departure warning mirror 4 and the driver eye position DE may be obtained from the angle of a rear view mirror 21, the driver side door mirror 1 and/or a passenger side door mirror 16. The angle information of the rear view mirror 21 is obtained from a rear view mirror angle detector 24. Such information of the relationship is stored in the look-up table 19 (ROM).

When the driver 10 adjusts the driver side door mirror 1, the driver side door mirror angle detector 14 detects the angle of the door mirror 1 and outputs a door mirror angle signal to the processing unit 18. The processing unit 18 reads out a target angle of the lane departure warning mirror 4 from the look-up table 19, and calculates an adjustment amount based on the target angle and the present angle of the lane departure warning mirror 4, so as to output the adjustment signal S0 to the lane departure warning mirror angle changing unit 17. The lane departure warning mirror angle changing unit 17 adjusts the angle of the lane departure warning mirror 4 according to the adjustment amount signaled by the adjustment signal S0.

Although the look-up table 19 in the above embodiment is used to obtain the target angle, the processing unit 18 may calculate the target angle based on the detection results of the driver and passenger side mirror angle detectors 14 and 15 and the rear view mirror angle detector 24, according to a predetermined formula without referring to the look-up table 19. Thus, in one embodiment of the invention, the angle of the lane departure warning mirror 4 may be automatically adjusted based on the relationship between the present angle of the lane departure warning mirror 4 and the driver eye DE position.

In recent years, some vehicles have been equipped with a seat position detecting device that includes a seat position detector 22 and a memory, in which the position of the driver seat is stored. In such a case, the relationship of a suitable position of the warning mirror 4 and the driver eye DE position may be obtained from the position of the seat 25 and the angles of the rear view mirror 21, the driver side mirror 1, and/or the passenger side mirror 16. The angle of the lane departure warning mirror 4 is automatically adjusted according to the relationship, so that more accurate adjustment of the lane departure warning mirror 4 can be accomplished.

The driver eye DE position may be determined by any means, for example, by a means for sensing the driver eye DE position such as a camera and an image processing device in which the driver eye DE position is determined. In such a case, information about the present angles of the side door mirrors 1, 16 and the seat position may not be required in order to determine the angle of the lane departure warning mirror 4.

Further, by adjusting the angle of the lane departure warning mirror 4, it is possible to change timing of the lane departure warning. That is, when the lane departure warning mirror 4 is adjusted so as to mirror an area distant from the vehicle 3, for example, an area close to a fender of the vehicle 3 or in a position anterior to a headlight of the vehicle 3, it is possible to warn the driver 10 earlier than in case in which the lane departure warning mirror 4 mirrors the area below the driver side mirror 1 since the edge mark M is reflected on the lane departure warning mirror 4 earlier. On the other hand, when the lane departure warning mirror 4 is adjusted so as to mirror an area close to the vehicle 3, the lane departure warning mirror warns the driver 10 when the vehicle 3 is about to reach the edge mark M. Further, when the lane departure warning mirror 4 is directed to a front side area of the vehicle 3, the same effects can be expected.

The warning timing may also be automatically adjusted by detecting a condition of the driver. For example, if the driver 10 is likely to fall asleep at the wheel, or tired, an earlier warning may be needed. On the other hand, when the driver 10 is in a normal driving state, an early lane departure warning may not be necessary. That is, it is possible to avoid an accident if drowsy driving is detected and an earlier warning is given to the driver 10.

As shown in FIG. 5, a driving condition detector 23 is connected to the processing unit 18. Thus, the detection results from the driver seat position detector 22, the door mirror angle detectors 14 and 15 and a driving condition detector 23 are inputted to the processing unit 18 respectively, and the processing unit 18 calculates an adjustment amount according to the information from these detectors 14, 15, 22 and 23, and outputs a door mirror angle signal S0 to the lane departure warning mirror angle changing unit 17.

In one embodiment, the driving condition detector 23 may be a driver eye monitoring system that detects a sensor monitor eyes of the driver 10 and determines that the driver 10 is likely to fall asleep or is tired. Alternatively, a driver 10 gaze detection system may be provided in which a gaze detector disposed slightly above the line of sight of the driver 10 at the top of the windshield detects an action of the driver, or a driving behavior monitoring system in which a unusual driving operation is detected to determine whether the driver 10 is likely to fall asleep or tired.

FIG. 6 shows a flowchart of adjustment of the lane departure warning mirror 4 based on condition of the driver 10. In step S1, it is determined that the processing unit 18 receives a signal indicating drowsy driving from the driving condition detector 23. If drowsy driving is indicated, the process proceeds to step S2. In the step S2, the processing unit 18 calculates an adjustment amount based on the outputs from the driver seat position detector 22, the driver side door mirror angle detector 14 and a driving condition detector 23, and outputs a door mirror angle signal S0 to the door mirror driving unit 17 so that the angle of the lane departure warning mirror 4 is adjusted so as to mirror a distant area.

In step S1, when it is determined that the processing unit 18 does not receives a detection result indicating drowsy driving, the process proceeds to step S3, the processor unit 18 outputs the door mirror angle signal S0 to the lane departure warning mirror changing unit 17 so as to change the angle of the lane departure warning mirror 4 back to a default angle. The routine is repeated at a predetermined interval. In one embodiment, the routine is repeated every second.

The default angle is set so as to mirror an area below the driver side mirror 1, for example, when the initial adjustment is carried out, that is, when the driver 10 makes an adjustment by changing the angle of the door mirrors, rear view mirror 21, for example, before the driver 10 operates the vehicle 3. The default angle may be reset during driving when the driver 10 adjusts the side mirrors 1 and 16 and/or rear view mirror 21.

Although, in the above described embodiment, the angle of the lane departure warning mirror 4 is automatically changed according to the condition of the driver, in one embodiment, the driver 10 may adjust the timing of a lane departure warning by manually adjusting the angle of the lane departure warning mirror 4. For example, when the driver 10 wants to receive an early waning, the angle of the warning mirror 4 can be manually adjusted so as to mirror an area distant from the vehicle.

Figure 7:
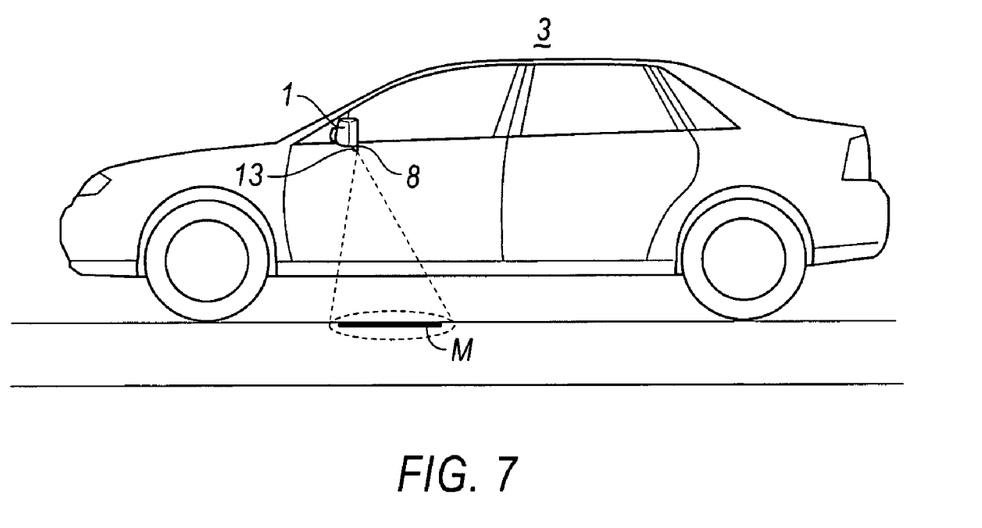
FIG. 7 is a right side view of a vehicle, wherein the lane departure warning mirror further includes an auxiliary lamp.

When driving at night or on rainy day, the driver 10 may not notice an edge mark M reflected on the reflective surface 8 of the lane departure warning mirror 4 as clearly as compared to a clear day because of darkness or poor visibility. To improve visibility at night or on a rainy day, the lane departure warning mirror 4 may be provided with an auxiliary lamp 13, as shown in FIG. 7. The auxiliary lamp 13 may be a side lamp attached to a step rail of a van, for example, that is positioned adjacent to the lane departure warning mirror 4. The auxiliary lamp 13 is disposed so as to illuminate the edge mark M so that the driver 10 can more clearly see the edge mark M on the reflective surface 8 of the lane departure warning mirror 4. The auxiliary lamp 13 may also be provided on the vehicle body. Further, two or more side lamps may be provided if needed. Thus, an auxiliary lamp 13 may be disposed at any position.

A switch for the auxiliary lamp 13 may be provided to selectively turn on or off the auxiliary lamp 13. In another embodiment, the auxiliary lamp 13 may be automatically turned on when a light switch 26 or a wiper switch 27 shown in FIG. 1 is turned on.

In the case where an edge mark M may not be clearly visible due to light from headlights of an oncoming vehicle, the angle of the auxiliary lamp 13 may be changed to illuminate an area other than the detection area such as a distant area and a front side area of the vehicle 3 or the auxiliary lamp 13 may be turned off, or the light intensity of the auxiliary lamp 13 may be selectively reduced.

Figure 8:
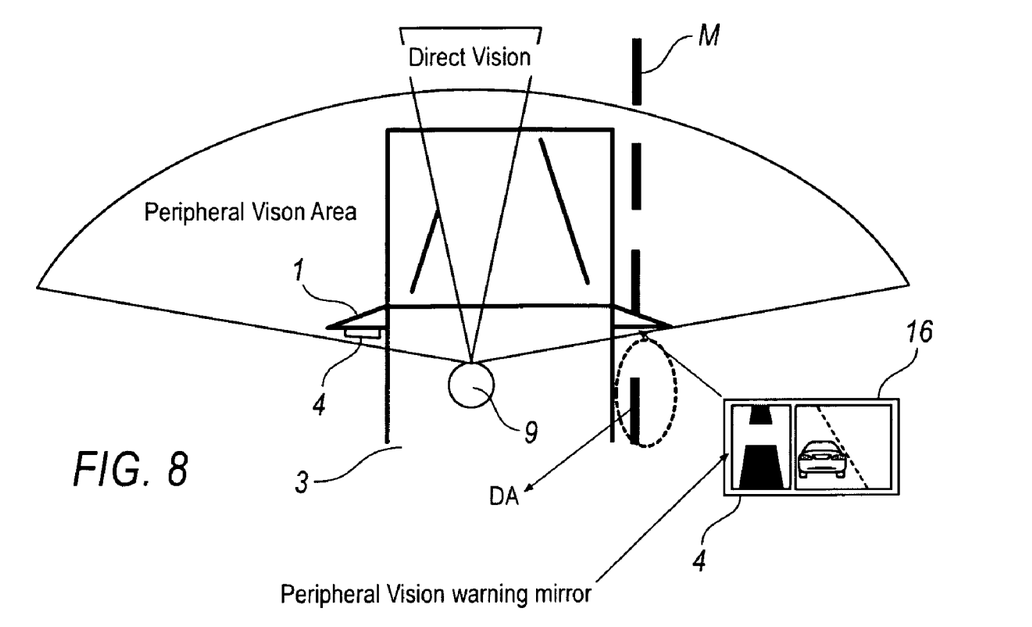
FIG. 8 is a top plane view of a vehicle, wherein the lane departure warning mirror is provided on a passenger side door mirror.

Although, in the above-described embodiment, the lane departure warning mirror 4 may be provided on a driver side door mirror 1, it is understood that the lane departure warning mirror 4 may be provided anywhere within a driver peripheral vision area. For example, in FIG. 8, the driver peripheral vision area (angle) that the driver 10 can see is shown. While driving, the driver 10 looks forward and mainly pays attention to a direct vision area. However, the driver 10 will notice change of an image on the reflective surface 8 of the lane departure warning mirror 4 when the vehicle is about to depart from the lane of travel even though the lane departure warning mirror 4 is not provided in the direct vision area. That is, as shown in FIG. 8, the present lane departure warning mirror 4 may be provided on a passenger side door mirror 1, or both the driver and passenger side door mirrors 1 and 16.

Also, in case where the vehicle 3 has fender mirrors, the lane warning mirror may be provided anywhere in peripheral vision area.

Figure 9:
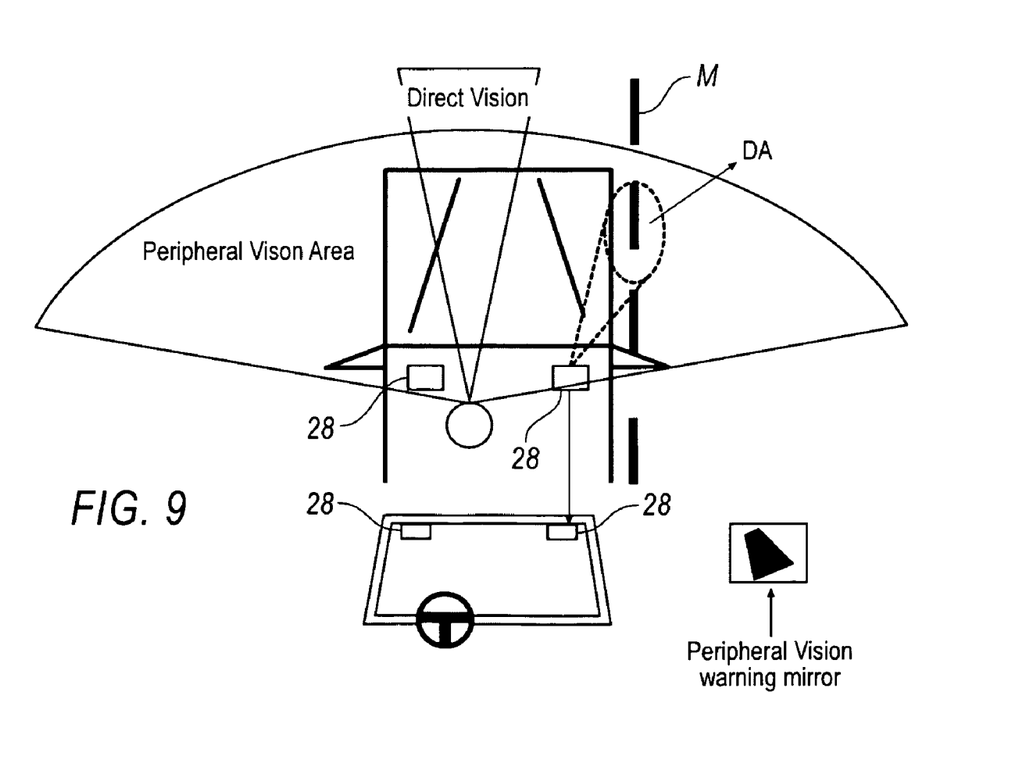
FIG. 9 is a top plan view thereof, wherein the lane departure warning mirror is disposed on a sun visor.

As shown in FIG. 9, for example, the lane departure warning mirror 4 may be provided on a lower portion of a sun visor. In this example, the lane departure warning mirror 4 is provided near a rotational axis of the sun visor so that the lane departure warning mirror 4 is used when the sun visor is not operated.

In yet another embodiment, the lane departure warning mirror 4 may be provided on a pillar(s) 28 of the vehicle 3. Thus, the lane departure warning mirrors 4 may be provided on at least one of the driver and passenger side door mirrors 1 and 16, the driver and passenger side sun visors and pillars 28 shown in FIG. 1.

Accordingly, while the above lane departure warning mirror 4 has been shown and described in connection with certain specific embodiments thereof, this is by way of illustration and not of limitation, and the appended claims should be construed as broadly as the prior art will permit

What is claimed is:

1. A lane departure warning device for a vehicle, comprising:
   a door side mirror;
   an auxiliary reflecting member; and
   a support member connecting the door side mirror and the auxiliary reflecting member to the vehicle such that the auxiliary reflecting member is located beneath the door side mirror, such that the auxiliary reflecting member faces at an angle relative to the door side mirror, and such that the door side mirror and auxiliary reflecting member are positioned at a location within the peripheral vision area of a driver, wherein the auxiliary reflecting member includes a surface angled relative to a surface of the door side mirror to provide enhanced viewing of an edge of a lane within a detection area, the detection area located along a lateral edge of the vehicle and including an area directly below the door side mirror.

2. The lane departure warning device according to claim 1, wherein the door side mirror and the auxiliary reflecting member are separate.

3. The lane departure warning device according to claim 2, wherein the auxiliary reflecting member is provided entirely below the door side mirror.

4. The lane departure warning device according to claim 1, wherein the lane departure warning device is provided on at least one of the driver and passenger side front pillars.

5. The lane departure warning device according to claim 1, wherein the detection area includes an area located generally below and rearward of the reflecting member.

6. The lane departure warning device according to claim 1, wherein the detection area includes an area located generally below and forward of the reflecting member.

7. The lane departure warning, device according to claim 1, wherein the auxiliary reflecting member is selectively rotatable independent of the door side mirror to a desired angle to provide a reflection of the detection area to the driver.

8. The lane departure warning device according to claim 7, wherein the auxiliary reflecting member is manually rotatable.

9. The lane departure warning device according to claim 7, wherein the lane departure warning device further includes an actuator that automatically rotates the angle of the auxiliary reflecting member to provide a reflection of the detection area within the peripheral vision area of the driver.

10. The lane departure warning device according to claim 1, further including an auxiliary lamp operatively connected thereto, wherein the auxiliary lamp selectively illuminates at least a portion of the detection area.

11. A lane departure warning device comprising:
a lane departure warning system having an auxiliary reflecting member; and
a support member connecting the auxiliary reflecting member to the vehicle such that the auxiliary reflecting member is located beneath a door side mirror, such that the auxiliary reflecting member faces at an angle relative to the door side mirror, and such that the auxiliary member is positioned at a location within a peripheral vision area of a driver, wherein the auxiliary reflecting member includes a surface angled relative to a surface of the door side mirror to provide enhanced viewing of an edge of a lane within a detection area, the detection area located along a lateral edge of the vehicle and including an area directly below the door side mirror.

12. The lane departure warning device according to claim 11, further including an auxiliary lamp that selectively illuminates the detection area.

13. The lane departure warning device according to claim 12, wherein the auxiliary lamp is automatically turned on when a windshield wiper switch is turned on.

14. The lane departure warning device according to claim 12, wherein the auxiliary lamp is automatically turned on when a headlight or parking light switch is turned on.

15. The lane departure warning device according to claim 12, wherein the auxiliary lamp is manually turned on upon an activation of an auxiliary lamp switch by the driver.

16. A vehicle comprising:
a lane departure warning system having a reflecting member; and
a support member connecting the reflecting member to the vehicle such that the reflecting member is positioned at a location within a peripheral vision area of a driver, wherein the reflecting member is configured and arranged to provide enhanced viewing of an edge of a lane within a detection area, the detection area located along a lateral edge of the vehicle; and
a control unit and a driving state detector, wherein when the driving state detector detects a drowsy driving condition or distracted driving condition, the control unit adjusts the configuration of the reflecting member so as to provide viewing of an area which is distant from the detection area.

17. The lane departure warning device according to claim 11, further including:
at least one of a door side mirror angle detector, a rear view mirror angle detector, and a seat position detector;
a processing unit; and
a control unit;
wherein an orientation of the auxiliary reflecting member is automatically rotated by the control unit based on information from the at least one of the door side mirror angle detector, the rear view mirror angle detector and the seat position detector.

18. The lane departure warning device according to claim 11, further including an eye position detector, wherein an angle of the auxiliary reflecting member is automatically rotated based on information from the eye position detector.

19. The lane departure warning device according to claim 11, wherein the support member is separate from a vehicle door side mirror assembly, and wherein the support member is configured to be attached to an external surface of the vehicle door side mirror assembly.

20. The lane departure warning device according to claim 11, wherein the auxiliary reflecting member is independently rotatable relative to the door side mirror.

* * * * *